United States Patent [19]

Sesona et al.

[11] Patent Number: 5,642,659

[45] Date of Patent: Jul. 1, 1997

[54] PANCAKE AND EGG COOKER

[76] Inventors: Albert J. Sesona, 7731 Manassas Ct. North, Jacksonville, Fla. 32277; Ernesto E. Blanco, 36 Sandrick Rd., Belmont, Mass. 02178

[21] Appl. No.: 625,903

[22] Filed: Apr. 1, 1996

[51] Int. Cl.⁶ ........................................ A47J 37/07
[52] U.S. Cl. ............................ 99/376; 99/377; 99/424
[58] Field of Search .......................... 99/372, 373, 376, 99/377, 380, 423, 424, 427

[56] References Cited

U.S. PATENT DOCUMENTS 434,788  8/1890  Jacoby ............................ 99/424
3,276,350  10/1966  Johns ............................. 99/424

*Primary Examiner*—David Scherbel
*Assistant Examiner*—Reginald L. Alexander
*Attorney, Agent, or Firm*—Arthur G. Yeager; Earl L. Tyner

[57] ABSTRACT

An electric pancake and egg cooker having two spaced cooking surfaces, the pancake and egg cooker having a cooking dish clamped in a pivotable cooking dish ring adapted to rest on the first cooking surface, and a cooking dish cover adapted to rest on the second cooking surface, the dish, ring, and cover being pivotable around a common axis shaft, and a catch means adapted to prevent the ring and dish from being pivoted until the cover is closed on the dish.

17 Claims, 10 Drawing Sheets

FIG. 10
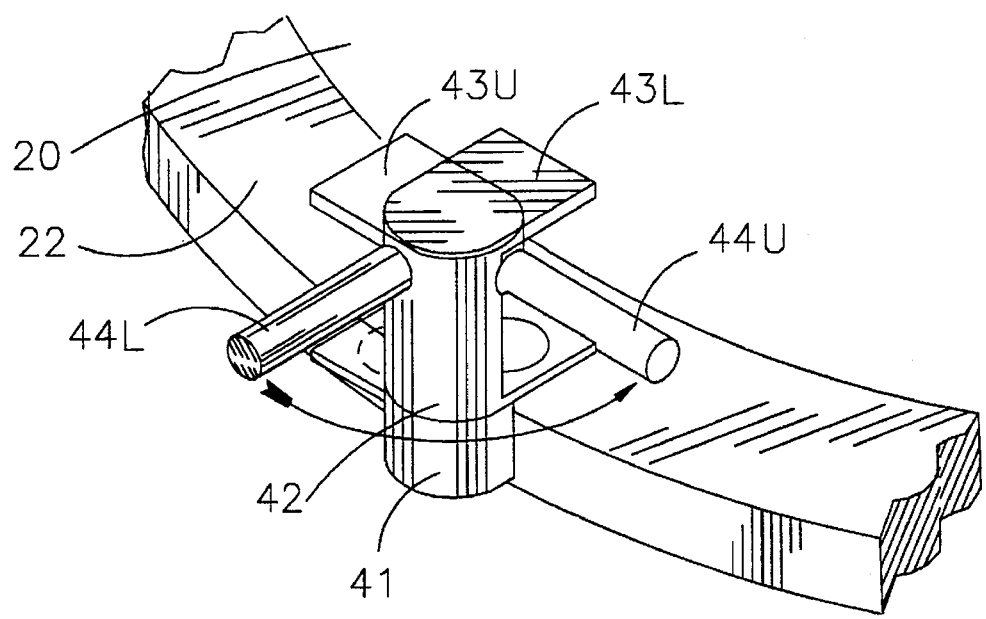
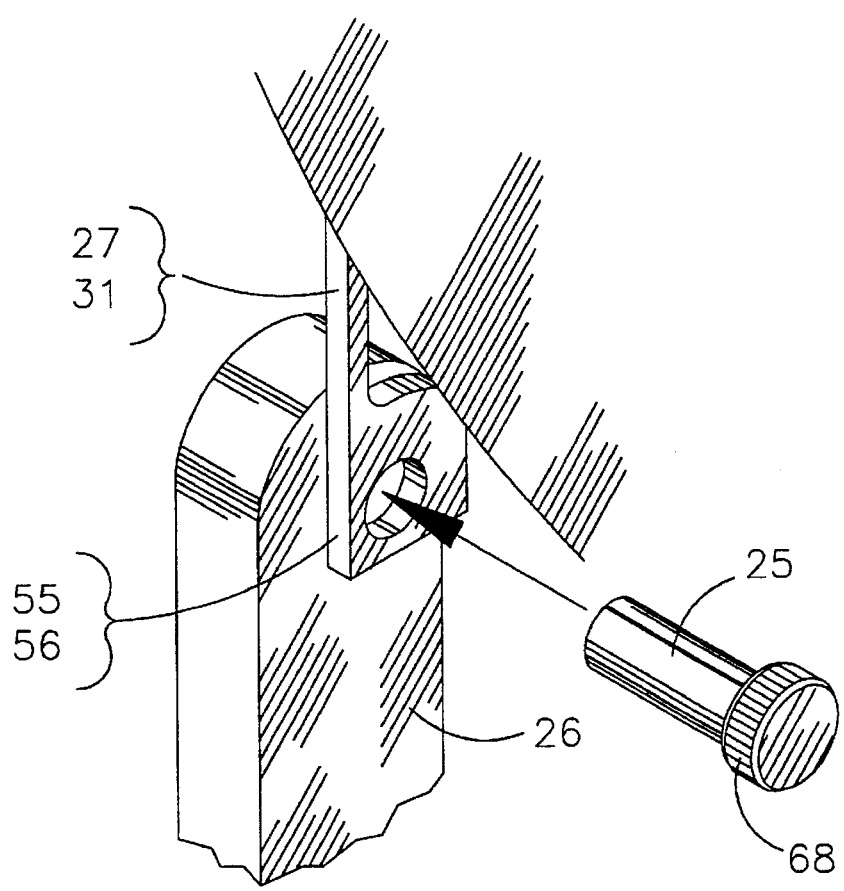
FIG. 11

PANCAKE AND EGG COOKER

TECHNICAL FIELD

This invention relates to the technical field of cooking; and more particularly, to the field of pancake and egg cookers.

BACKGROUND OF THE INVENTION

This invention relates to an apparatus for cooking, flipping, monogramming and discharging one or more pancakes, eggs or omelets.

The preparation and production of pancakes, eggs and omelets has been and continues to be, for the most part, labor intensive. Most food establishments buy dry batter flour mix in large bulky sacks which require heavy lifting and proper storage to deter contamination and/or degradation. Portioning and liquefying of the batter mix is generally accomplished manually. Eggs and omelets are usually cooked in individual pans so as to contain the eggs in a small space.

Pancakes and eggs or omelets are usually cooked to order so as to be at optimum taste and texture when served. Thus, a chef must be quick and agile in flipping the foods over to be cooked on the other side, and many an egg is ruined by inept flipping. Some chefs prefer different temperatures for pancake cooking than for egg and omelet cooking, all of these variables lead to waste in such cooking and improperly cooked dishes. Any mechanical assistance in this cooking art will find a ready acceptance by the restaurant business.

Regardless, of method chosen, upon reviewing industry-wide food server needs and the exceptionally high-profit potential of pancakes and eggs, one quickly recognizes the desirability of an apparatus capable of eliminating the usual fuss and mess of such food preparation.

Many inventors in the past have attempted to introduce an automatic pancake cooking apparatus, one of the first being Jaffe, U.S. Pat. No. 2,830,529.

In our U.S. Pat. No. 5,481,963, issued Jan. 9, 1996, there is disclosed a novel automatic pancake cooker which eliminates the prior art problem or partially cooking the batter by the heat of the cooker, and which provides a continuous supply of properly cooked pancakes having, if desired, an embossed message on the pancake.

It is an object of this invention to provide a novel nonautomatic pancake breakfast grill for preparing pancakes, eggs and omelets. It is another object of this invention to provide a superior apparatus which is easy to operate and which can provide pancakes or omelets with an embossed message thereon. This apparatus may be used in conjunction with a normal cooking or it may be a separate self-contained cooker. Still other objects will appear in the more detailed description found below.

BRIEF DESCRIPTION OF THE INVENTION

This invention relates to a breakfast grill for cooking a liquid batter for egg preparation into a breakfast entree including pancakes, eggs, and/or omelets. A cooking dish is provided to receive pancake batter or eggs for cooking, a cooking dish holder ring to support the cooking dish, a cover for the cooking dish and two spaced heated cooking positions. The cooking dish is clamped to the holder ring by a plurality of perimeter tabs on the ring. A common axis pivot arrangement connects the cooking dish and its holding ring to the cover so as to permit the cover to be closed over the top of the cooking dish while at the first cooking position and then pivot the dish, the ring and the cover to a second cooking position. The cooking positions may be heating burners on a normal cooking range, or they may be hot plates that are part of a separate apparatus heated by commercial electricity. The cooking dish may be embossed with a message to appear on the face of the cooked pancake or omelet.

In a specific embodiment there is included an automatic safety catch that prevents any pivotal movement of the cooking dish and the ring until the cover is closed over the dish. In another embodiment one of the tabs holding the dish to the ring is manually operable to lock and to unlock the dish to the ring.

BRIEF DESCRIPTION OF THE DRAWINGS

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

FIG. 10 is an isometric view of the locking tab for clamping the cooking dish in place;

FIG. 11 is an exploded isometric view of the pivot means for turning the pancake over to cook the second side;

DETAILED DESCRIPTION OF THE INVENTION

Figure 1:
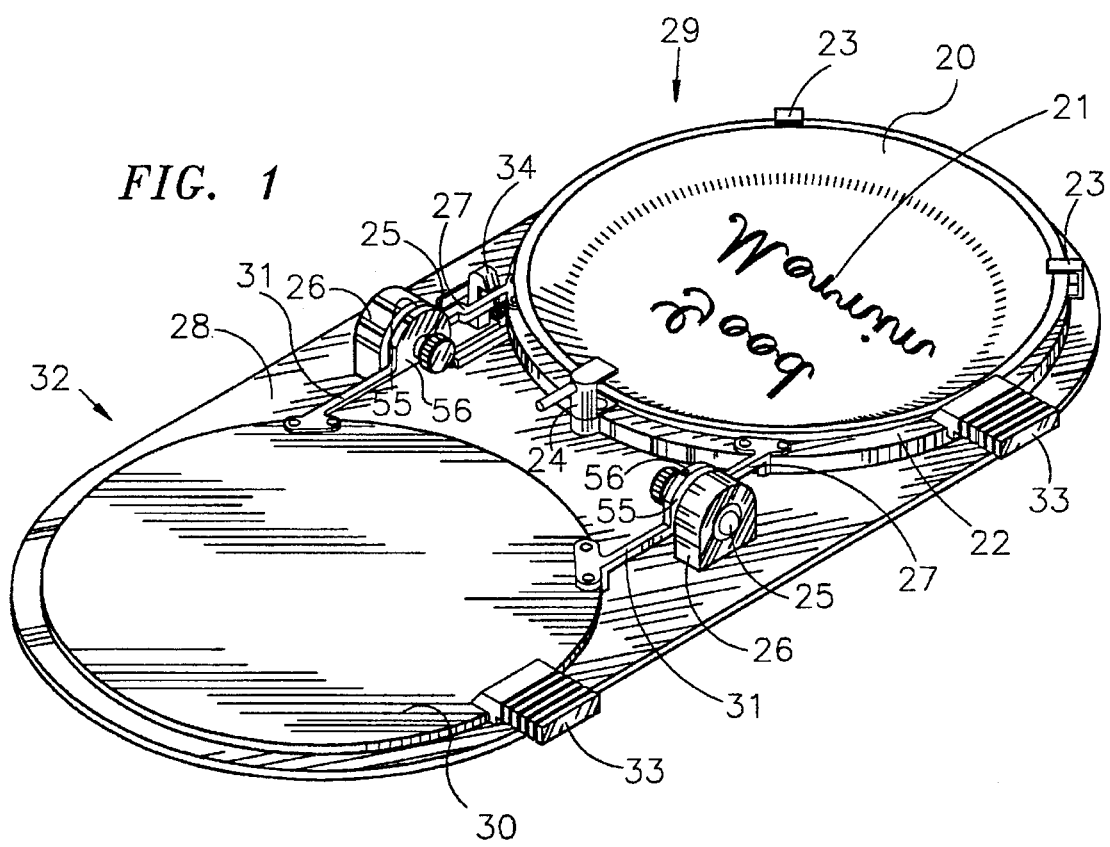
FIG. 1 is an isometric view of one embodiment of the apparatus that best shows exterior component parts in place and numbered accordingly.

The features of this invention are best understood by reference to the accompanying drawings.

A first embodiment is shown in FIGS. 1–6 wherein the apparatus rests directly on two burners of a residential cooking range, which will provide the heat necessary to cook pancakes made by this apparatus.

A base plate 28 of aluminum, steel or other heat transferable material, supports the remainder of the pancake cooking apparatus. This invention provides two cooking positions for cooking the two sides or faces of the pancake, and these positions each are directly over individual burners of the cooking range. First cooking position 29 cooks the side of the pancake or omelet wherein the message 21 will be cooked into the pancake or omelet. Message 21 is formed by raised lettering on the cooking dish 20. The bottom of the cooking dish 20 rests directly on base plate 28 receiving heat from a burner by conduction through base plate 28. Cooking dish 20 is preferably made of aluminum because of its good heat conductivity, inexpensiveness and lightness of weight. Other metals or heat transferable materials are also operable, but not preferred.

Cooking dish 20 rests on cooking dish holder ring 22 which supports cooking dish 20 from under its rim, and dish 20 is securely clamped to ring 22 by tabs 23 and locking tab 24. Cooking dish 20 is truly a dish with a higher rim and a cover center, which is ideal for cooking eggs that tend to run in all directions on a flat surface such as a grill top. Tabs 23 and 24 have lips extending inwardly toward the center of dish 20 from its perimeter. Locking tab 24 is shown in detail in FIG. 10. Stationary pin 41 is fixed to ring 22 and supports sleeve 42 which is rotatable around pin 41. Lip 43 is affixed to sleeve 42 and is rotated by movement of finger handle 44. In the unlocked position with finger handle at 44U and lip and 43U, dish 20 may be removed from ring 22. When finger handle is moved to 44L, the locking lip will be at 43L extending inwardly over the rim of cooling dish 20 clamping dish 20 securely to ring 22.

A second cooking position at 32 is at the beginning of the cooking cycle as shown in FIG. 1 with a portion of base plate 28 over a burner in the cooking range separate from the burner at first cooking position 29. Cover 30 rests directly upon base plate 28 at second cooking position 32.

Ring 22 and cover 30 both are pivotable around a single common axis that runs through spaced stub shafts 25, each being supported in a housing 26. This insures that cover 30 and dish 20 will exactly match and meet around their rims when closed on each other. Ring 22 is connected to a washer-like disc 55 which encircles shaft 25 by arms 27. Cover 30 is connected to disc 56 which encircles shaft 25 by arms 31. The functions of arms 27, 31 and discs 55 and 56 causes cover 30 to pivot so as to precisely cover dish 20 and to touch dish 20 entirely around the rim of dish 20. It is crucial to totally entrap the food (pancake or omelet) and be able to flip the food in dish 20 to its other side for cooking on cover 30.

A safety catch mechanism 34 will be described in detail hereinafter, but its purpose is to grasp arm 27 and prevent ring 22 and dish 20 from being pivoted until cover 30 is firmly held against dish 20. Otherwise, the pancake in dish 20 with one side cooked and the other side uncooked, might be inadvertently flipped and ruined before cover 30 was closed over dish 20. When cover 30 is closed over dish 20, catch mechanism 34 is automatically tripped to allow ring 22 to become pivotable. Handles 33 are employed to hold cover 30 against dish 20 and to pivot ring 22 and cover 30. Cooking dish 20 and cover 30 may be any shape, round, square or the like so long as both 20 and 30 are exactly the same so as to fit together precisely during the flipping step.

Figure 2:
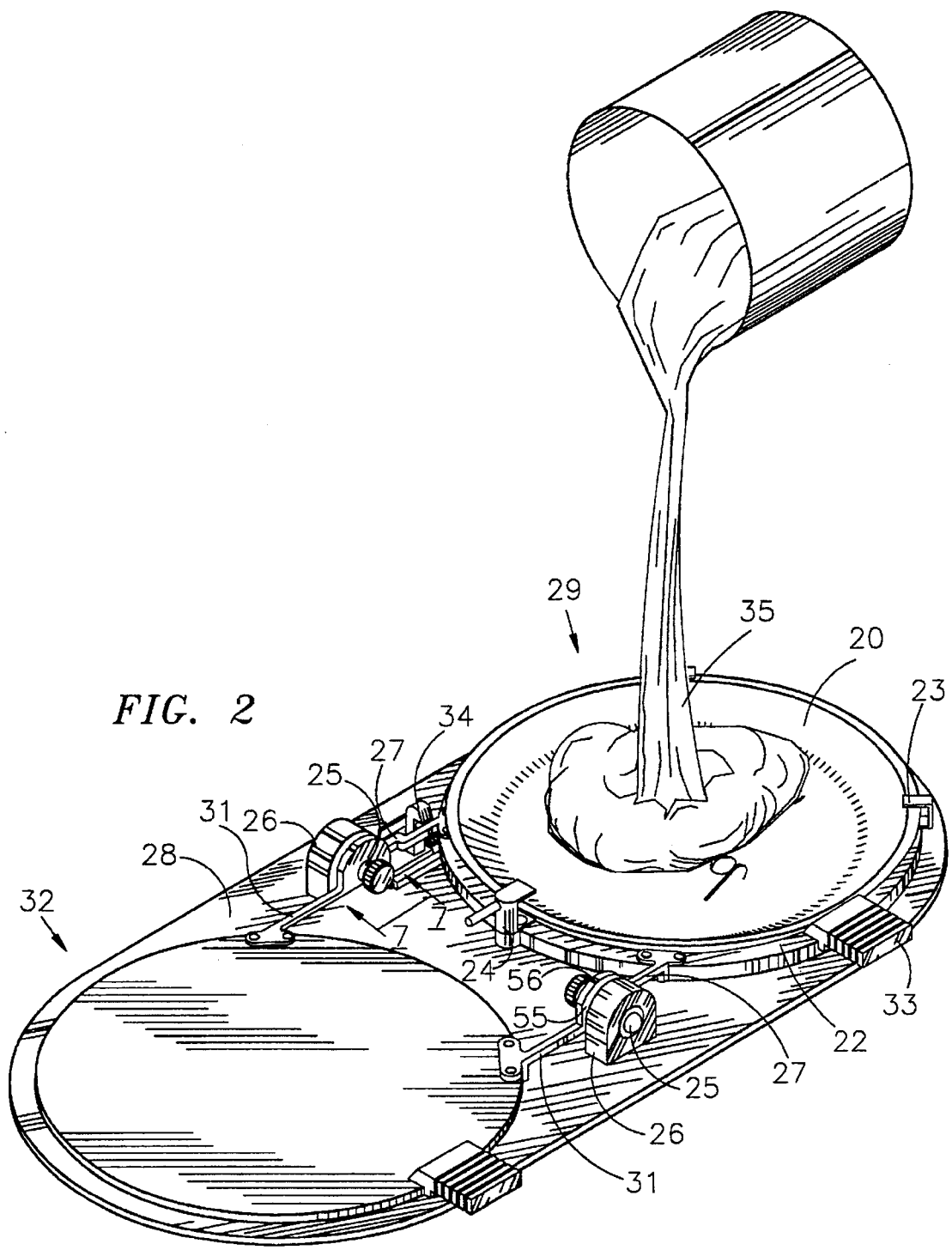
FIG. 2 is an isometric view similar to that of FIG. 1 showing liquid batter mix being poured onto a cooking dish.
Figure 3:
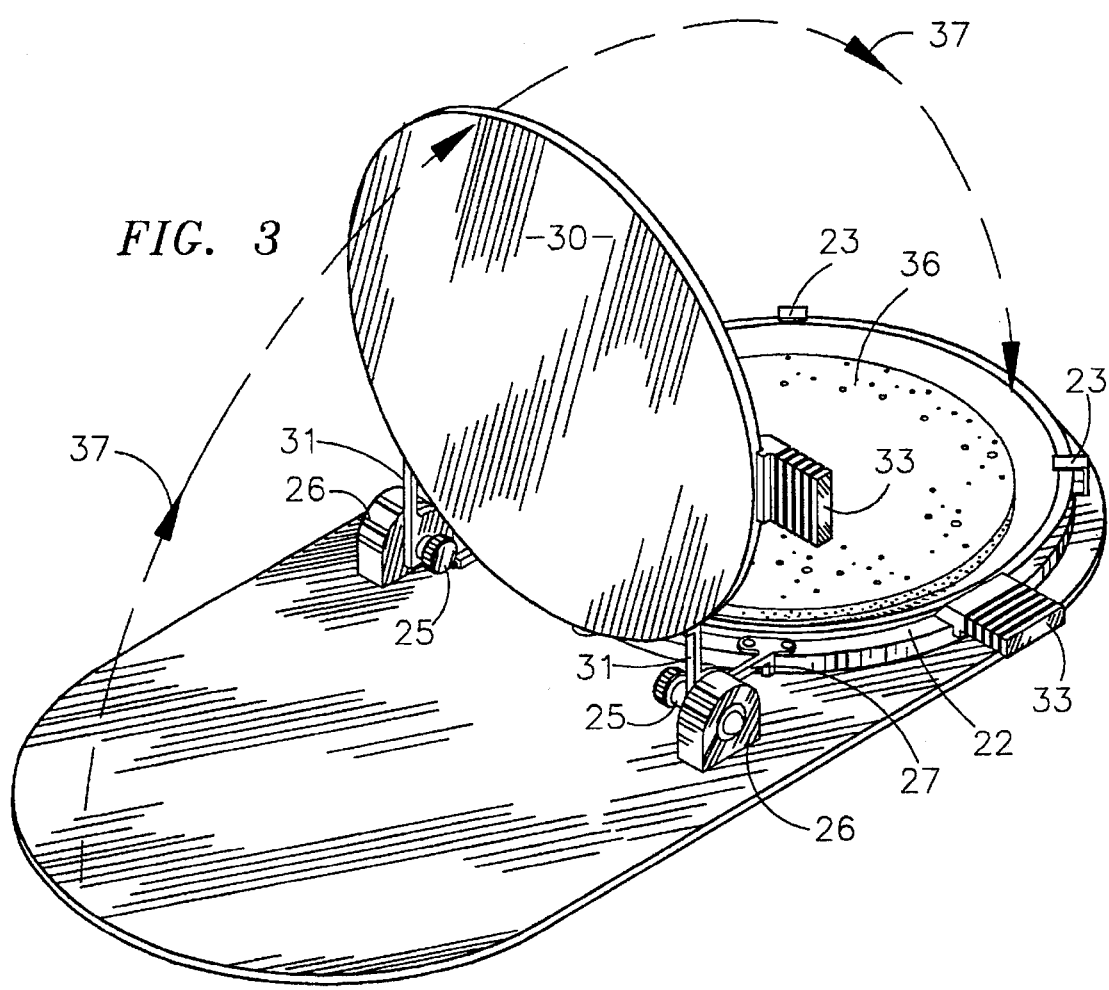
FIG. 3 is another isometric view similar to FIGS. 1 and 2 showing the cover being closed over the cooking pancake.
Figure 4:
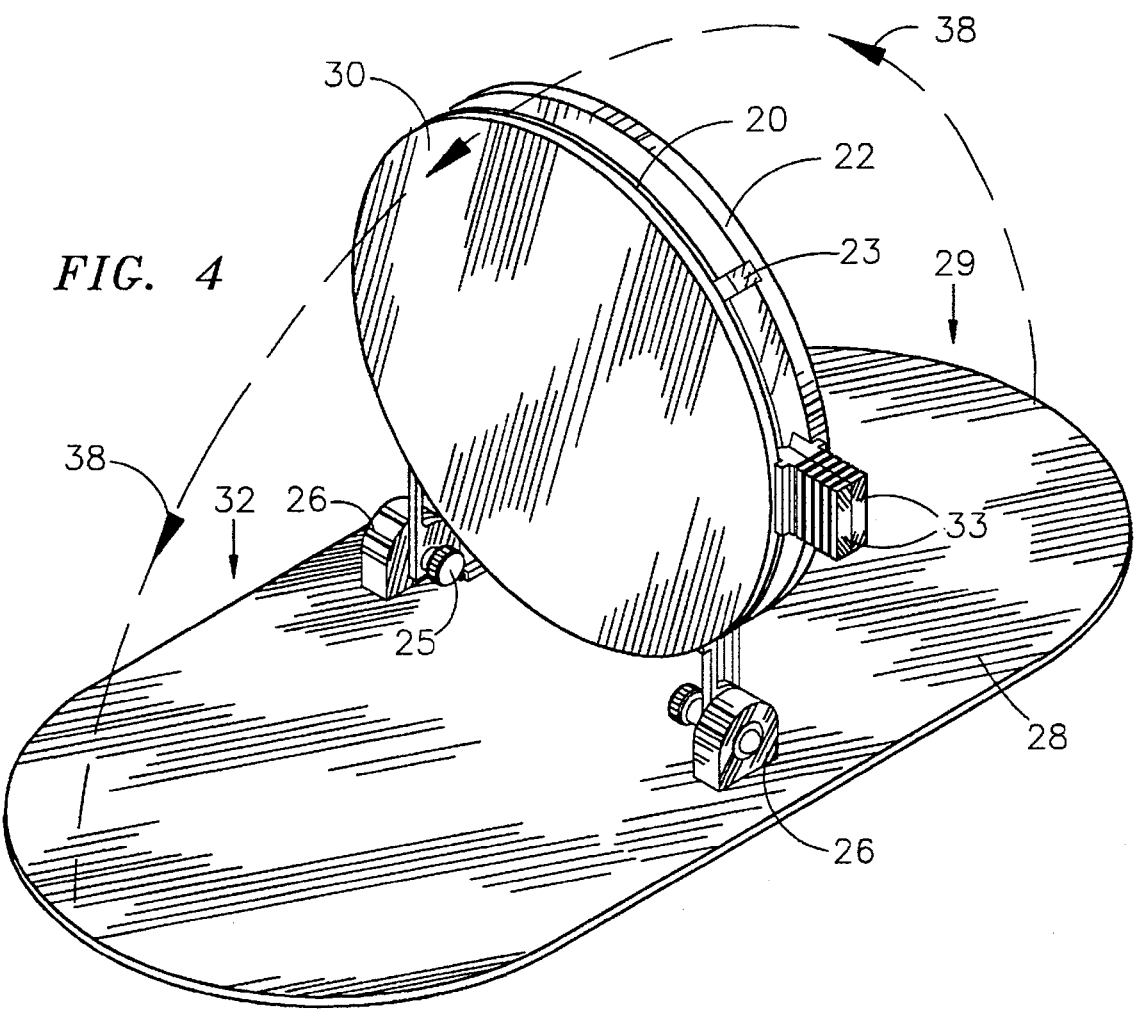
FIG. 4 is another isometric view similar to FIGS. 1–3 showing the cover, the cooking dish and the holder ring being pivoted from the first cooking position to the second cooking position so as to cook the second side of the pancake.
Figure 5:
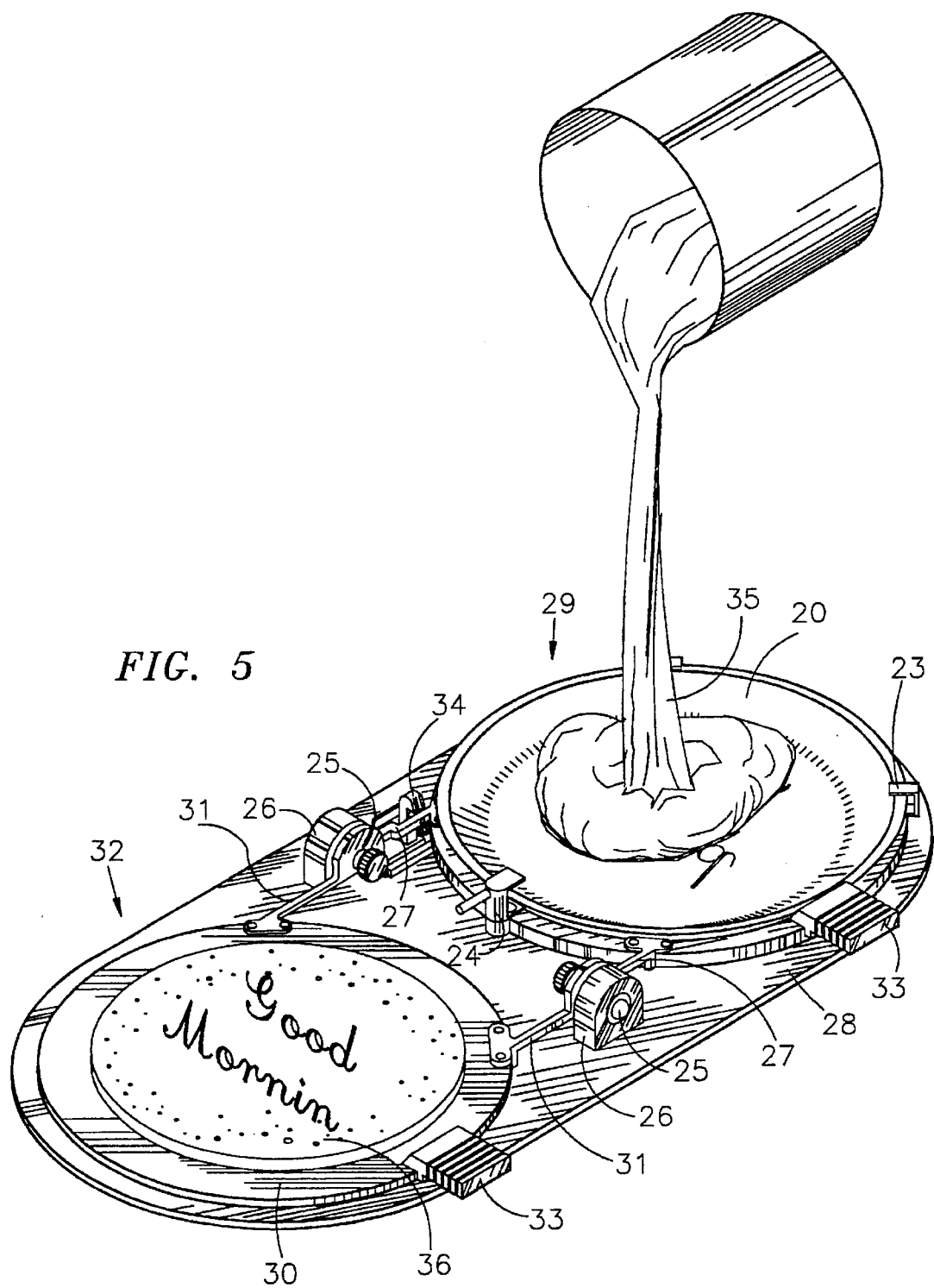
FIG. 5 is another isometric view similar to FIGS. 1–4 showing flipped over pancake cooking on the second cooking surface, the ring and the dish returned to the first cooking position and batter being poured to begin cooking the second pancake.
Figure 6:
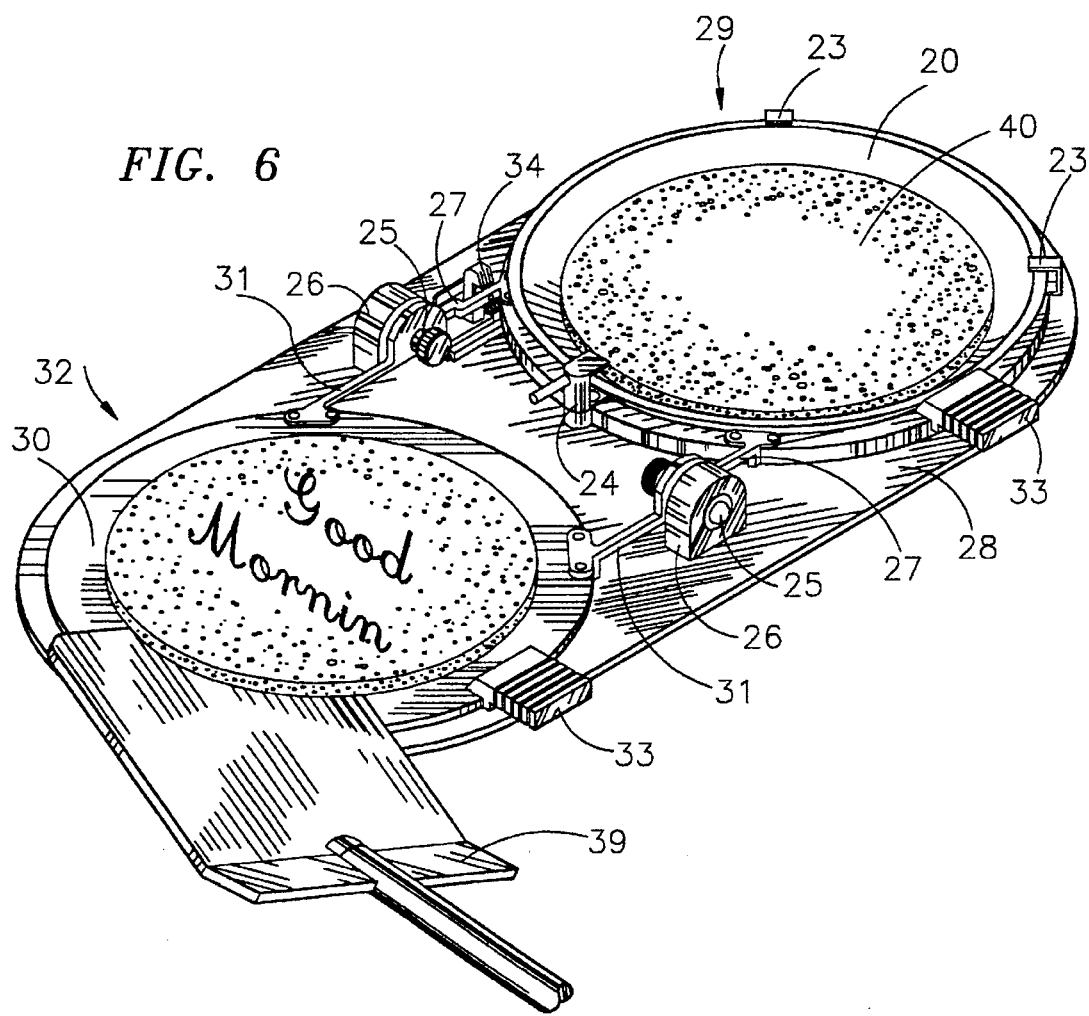
FIG. 6 is another isometric view similar to FIGS. 1–5 showing fully cooked pancake being removed from the cover by use of a spatula, while the second pancake is awaiting the cover to be closed so as to cook its second face.

The complete operation of making a pancake by the invention of this application is shown in FIGS. 2–6. In FIG. 2 batter 35 is poured onto dish while it is resting in the first cooking position 29. In FIG. 3 pancake 36 is cooked on the side contacting dish 20, (i.e., the bottom side as shown in FIG. 3), and is ready to be flipped over to cook the uncooked top side. This is accomplished by grasping handle 33 of cover 30 and pivoting cover 30 in the direction of arrows 37 to close cover 30 over dish 20 and the pancake 36 therein. In FIG. 4 cover 30 has been closed upon ring 22 and dish 20 containing a partially cooked pancake. The entire combination is being flipped over by pivoting cover 30, dish 20, and ring 22 in the direction of arrows 38 to the second cooking position 32 where the uncooked side of the pancake will be cooked to a finished texture. By gripping both handles 33 together as shown in FIG. 4 the entire combination of cover 30, ring 22, dish 20 and the enclosed pancake move together as a unit. As soon as the combination of pivoting components reaches second cooking position 32, cover 30 and the flipped pancake 36 remain in position to finish cooking the pancake, which ring 22 and cooking dish 20 are returned to first cooking position 29 to receive batter and to begin cooking the second cooking cycle. Finally, in FIG. 6 there is shown the removal of the fully cooked first pancake from cover 30 by use of a spatula 39, leaving cover 30 free to be closed on second pancake 40 and to repeat the previous steps of flipping, finish cooking, removal, etc.

Figure 7:
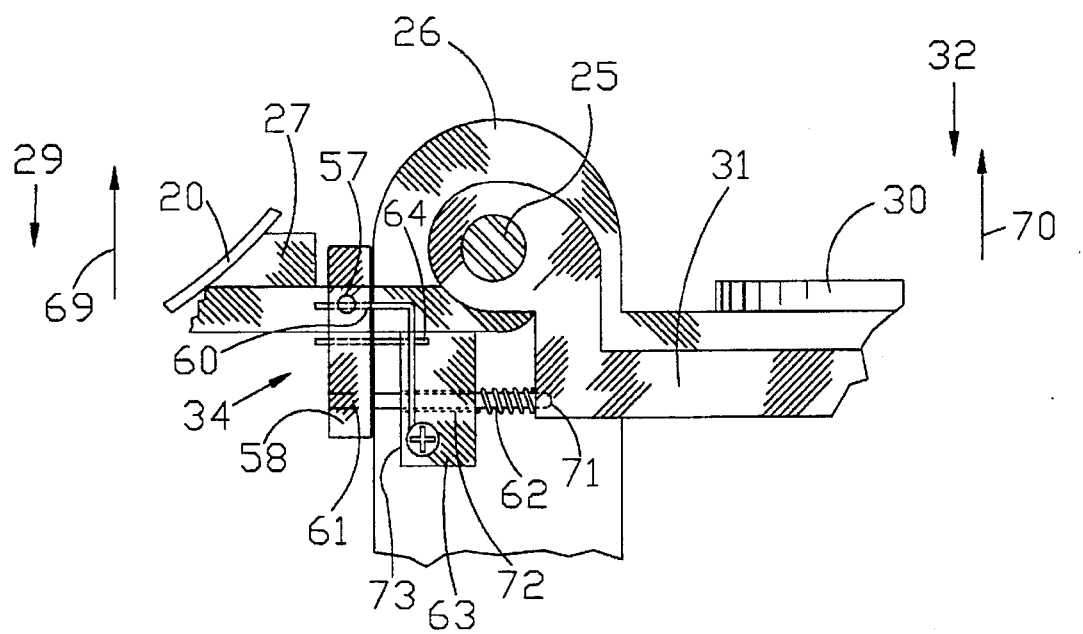
FIG. 7 is a front elevational view of the automatic catch assembly taken in the direction of 7—7 of FIG. 2.
Figure 8:
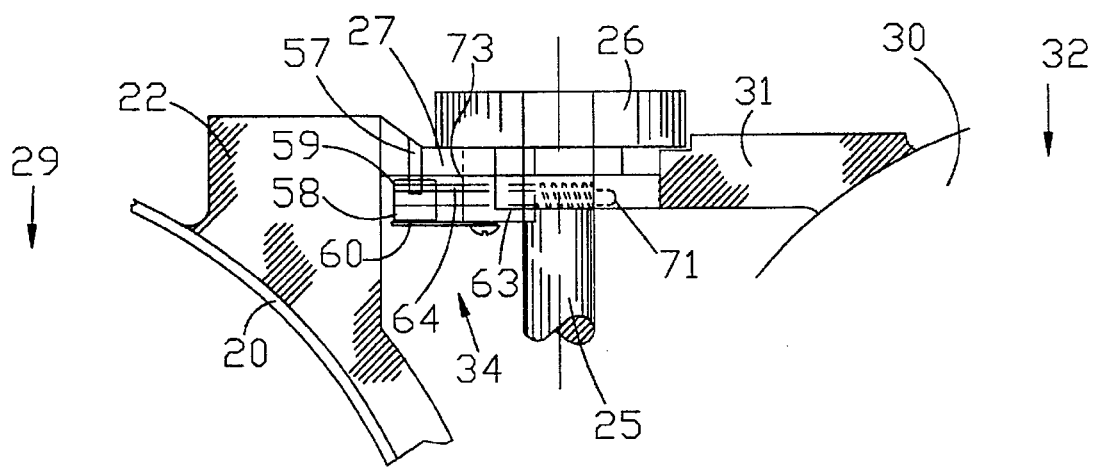
FIG. 8 is an a top plan view of the catch assembly shown in FIG. 7.
Figure 9:
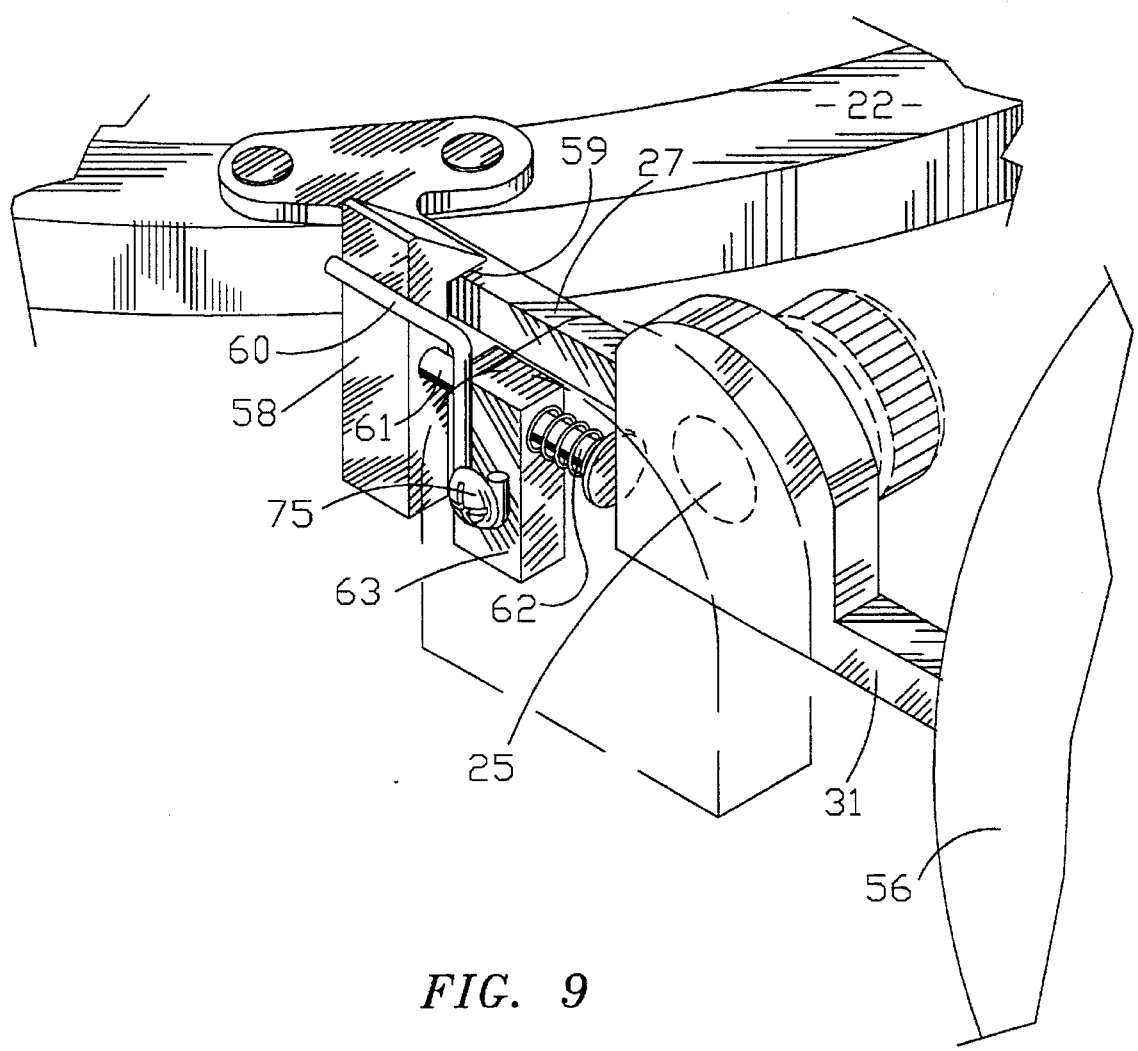
FIG. 9 is an enlarged isometric view of the safety catch assembly shown in FIGS. 7–8.

In FIGS. 7–9 there is shown an automatic catch means adapted to prevent the pivoting of the cooking dish 20 until cover 30 is closed upon dish 20. This prevents unintentional spilling of uncooked pancakes, and at the same time provides a ready means to flip the pancake over to cook the second side. Cooking dish 20 rests in cooking dish ring 22 on the right hand side of the machine.

FIG. 9 shows an enlargement of the safety catch means for a better understanding of its working. Shaft 25 is supported in housing 26, and in turn, shaft 25 is attached to arms 27 and 31 and functions as a common axis pivot shaft for both dish ring 22 and cover 30.

Stop pin 57 is fixed to arm 27 and projects outwardly and under overhanging ledge 59 of catch body 28 having a sloping top surface 74. Pin 57 is caught by ledge 59 when body 58 is in the position shown in FIG. 9 should anyone attempt to pivot ring 22 upward in the direction of arrow 69. This functions as a safety against anyone inadvertently trying to flip a pancake in the first cooking position 29 to the second cooking position 32.

Catch body 58 is supported by a pivot pin 60 affixed to body 58 and slidably resting in bore 72 of spring block 63. Body 58 is supported in its vertical position, spaced close to arm 27 by a long wire spring 60 fixedly attached to screw 75 in spring block 63. In alignment with bore 72 is a pin 71 fixed into arm 31 and positioned to project into bore 72 arm 31 is at rest as shown in FIG. 9, and slidable out of bore 72 when arm 31 and cover 30 are pivoted upwardly in the direction of arrow 70. Coil spring 62 encircles pin 71 and extends from arm 31 to pin 61 in bore 72. When arm 31 is at rest as shown in FIG. 9 spring 62 pushes pin 61 and body 58 to the right. When arm 31 is pivoted upwardly in the direction of arrow 70, the compression on spring 62 is decreased and pin 61 and body 58 move to the left until body 58 contacts wall 73 of spring block 63. A guide rod 64 affixed in spring block 63 extends across the front wall of body 58 parallel to spring wire 60 extending across the rear wall of body 58. Guide rod 64 serves as a stop for the pivoting of body 58 so as to space it properly from arm 27 against guide rod 64.

In a pancake cooking operation batter is poured into cooking dish 20 on ring 22 while in the first cooking position 29 as shown in FIG. 9. When the first side of the pancake is cooked sufficiently, cover 30 is pivoted upwardly in the direction of arrow 70 until it closes over the top of cooking dish 20 enclosing the partially cooked pancake therein. When cover 30 is pivoted in this fashion, spring 62 is released and body 58 and pin 61 move to the left to rest against wall 73 of spring block 63. This uncovers pin 57. Cover 30, ring 22, cooking dish 20 and the enclosed partially cooked pancake are now pivoted as a unit in the direction of arrow 69 until the entire unit is at second cooking position 32, causing the pancake to be flipped over to cook the second side while resting on cover 30. This pivoting operation puts pressure on spring 62 which moves body 58 and pin 61 back to the position shown in FIG. 9. The empty cooking dish 20 and ring 22 are now pivoted back to first cooking position so that a second pancake can be started by pouring new batter into the cooking dish 20. The pivoting movement of cover 30 and of the unit of dish 20, ring 22 and cover 30 is shown by double arrow 67. On the way back to first cooking position 29, arm 27 and pin 57 will come in contact with body 58 which by now is in the position shown in FIG. 9. Pin 57 strikes sloping top surface 74 and pushes it out of the way be causing body 58 to pivot rearwardly around pin 61 and against the force of spring wire 60, which is flexible enough to permit such movement. As soon as pin 57 pushes its way past sloping top surface 74, spring wire 60 forces body 58 forward until it contacts guide rod 64 where overhanging ledge 59 is in its proper position to catch stop pin 57 again. The forward and rearward pivot movement of body 58 is shown by double arrow 65.

There are numerous messages 21 that may be embossed on a dish 20, thereby allowing choices of different messages, e.g., "Good Mornin'", "Merry Xmas", "Happy Birthday", "Good Luck", etc.

Other optional alternatives include the use of a single unitary pivot shaft instead of two stub shafts 25 positioned in a common axis; the use of a different design of catch mechanism 34 to accomplish the same purpose, and the like.

FIG. 11 shows the details of the pivot means for cover 30 and ring 22. Housing 26 is pierced with a bore of suitable size to receive stub shaft 25. Arms 27 and 31 are each connected to shaft 25 by a disc or washer-like connection pivotable about shaft 25. Preferably, shaft 25 includes a knurled head which may be grasped to remove shaft 25 when needed for cleaning purposes.

Figure 12:
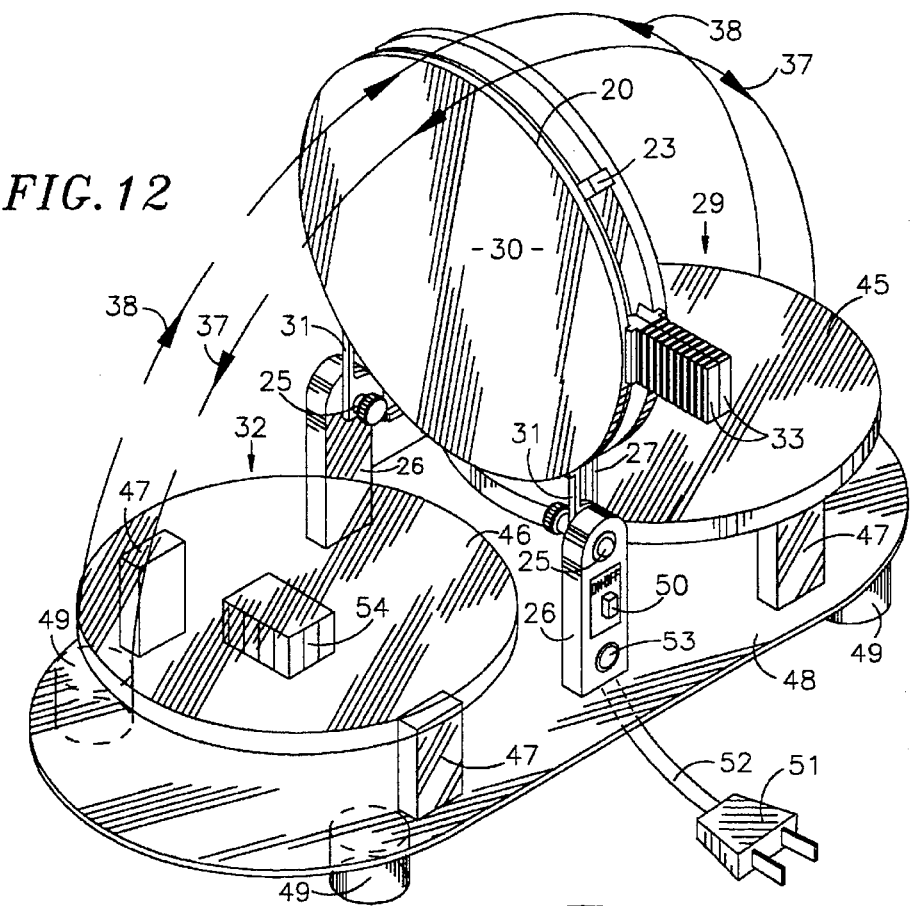
FIG. 12 is an isometric view of a second embodiment of the pancake cooking apparatus of this invention.

FIG. 12 shows a second embodiment of the pancake maker of this invention. In this embodiment the apparatus includes its own cooking power. All other components are identical to those discussed above. In this embodiment there is first a hot plate 45 in the first cooking position 29 and a second hot plate 46 in the second cooking position 32. A base support plate 48 with legs 49 supports the entire apparatus and permits it to be placed on any table or other horizontal surface. Hot plate legs 47 support each hot plate 45 and 46 a selected distance above base support plate 48. Each hot plate 45 and 46 has an electric heating element capable of transforming the incoming power to the necessary cooking temperature. A temperature control may be included if desired, although it is not shown here. Incoming power is available from a commercial or residential power outlet (not shown) through plug 51 and lead wire 52 to an on/off switch 50 and thence to a thermostat at such hot plate 45, 46. At the on/off switch 50 there may also be a signal light 53 which is on when switch 50 is on. All other components and processing steps are identical to those discussed above.

Figure 13:
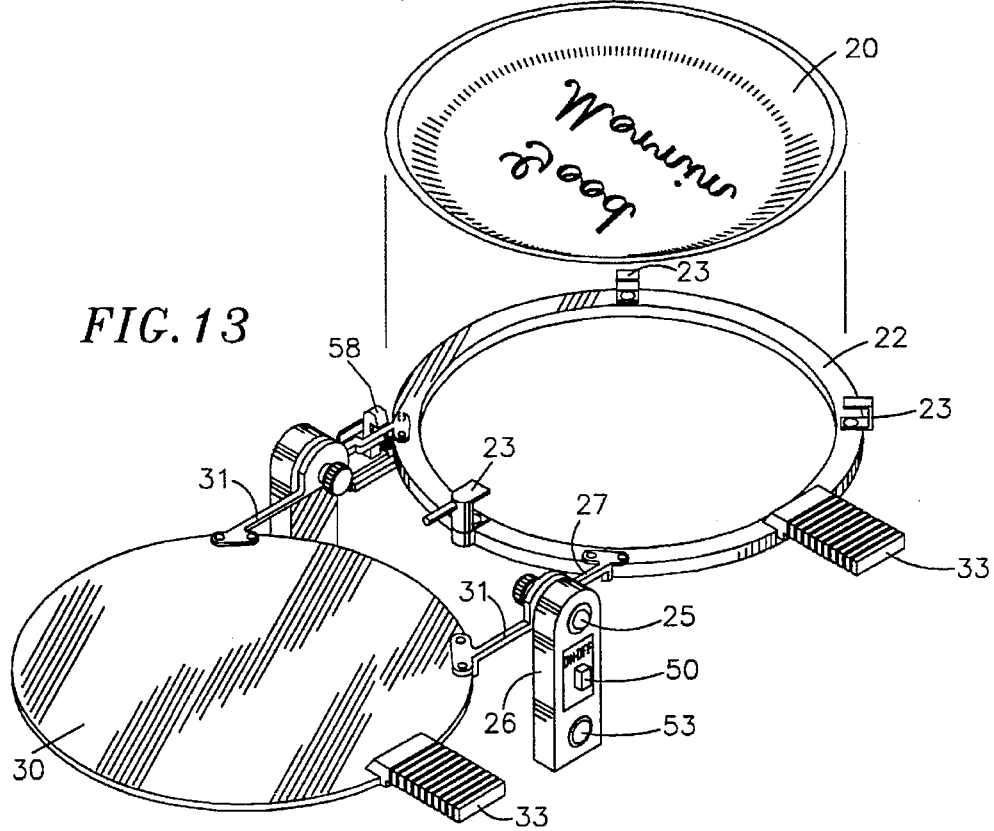
FIG. 13 is an exploded isometric view of the pancake cooking apparatus of this invention.

FIG. 13 shows an exploded isometric view of the principal features of this invention, which illustrates cooking dish 20 being removed upwardly from holder ring 22. The other features of this apparatus are the same as those described above with respect to FIG. 12, except that base support plate 48 is not included so as to simplify the view.

It should be noted that although this apparatus is principally indicated to be a pancake cooker, it is equally useful as an egg omelet cooker, an egg frying pan for single eggs, scrambled eggs, and the like and there may be other dishes that can be cooked with this apparatus whether the dish requires flipping to cook the second side or whether only one side needs to be cooked.

While the invention has been described with respect to certain specific embodiments, it will be appreciated that many modifications and changes may be made by those skilled in the art without departing from the spirit of the invention. It is intended, therefore, by the appended claims to cover all such modifications and changes as fall within the true spirit and scope of the invention.

What is claimed as new and what it is desired to secure by Letters Patent of the United States is:

1. A manually operated breakfast cooking grill comprising a cooking dish adapted to receive and retain a selected amount of an uncooked liquid food preparation employed in making a breakfast entree selected from the group consisting of a pancake an omelet and a fried egg, a cooking dish holder ring, cooking dish cover and two spaced cooking positions for cooking two sides respectively of the entree, the cooking dish holder ring including a plurality of tabs for selectively securing said dish to said ring, pivot means common to said ring and to said cover adapted to selectively close said cover to said dish in a first said cooking position and to move said cooking dish to a second said cooking position, a handle on each of said ring and said cover, and heating means for each of said cooking positions, and a catch means to prevent movement of said cooking dish to the second cooking position until said cover is closed thereon.

2. The cooking grill of claim 1 wherein said cooking dish is embossed so as to produce a message on a pancake surface.

3. The cooking grill of claim 1 wherein said pivot means includes two spaced aligned stub shafts, each said stub shaft being pivotally connected to arms extending from said ring and from said cover.

4. The cooking grill of claim 1 wherein said heating means includes two spaced electric hot plates powered by a suitable connection to a commercial electricity outlet.

5. The cooking grill of claim 1 wherein said heating means includes two burners on a residential cooking range.

6. The cooking grill of claim 1 wherein said catch means includes a pivotable catch body adapted to cooperate with a stop pin to prevent said dish and ring from being moved pivotally until said cover is pivotally moved to close over said dish.

7. The cooking grill of claim 1 wherein one of said tabs is manually operable from an unlocked position to a locked position and vice versa to prevent unintended movement of said dish with respect to said ring.

8. The cooking grill of claim 1 wherein said breakfast entree is a pancake.

9. The cooking grill of claim 1 wherein said breakfast entree is an egg omelet.

10. The cooking grill of claim 1 wherein said breakfast entree is a fried egg.

11. A manually operated cooking grill comprising a cooking dish, a cooking dish holder ring, a cooking dish cover and a base plate of heat transferable material having a first and a second cooking position spaced apart from each other, said first position being located for said cooking dish to rest thereon while held by said ring, said second position being located where said cover rests thereon, said dish being releasably secured to said ring by a plurality of perimeter tabs on said ring; common pivot means for said cover and said holder ring permitting said dish to rest upon and be heated at said first position and be turned over with said cover resting upon and being heated at said second position, and an automatic pivotable catch body adapted to contact a stop pin attached to said ring and preventing pivoting of said ring until said cover is closed upon said dish.

12. The cooking grill of claim 11 wherein said cooking dish is embossed so as to produce a message on a pancake surface.

13. The cooking grill of claim 11 wherein said pivot means includes two spaced aligned stub shafts, each said stub shaft being pivotally connected to arms extending from said ring and from said cover.

14. The cooking grill of claim 11 further comprising heating means for each of said cooking positions.

15. The cooking grill of claim 14 wherein said heating means includes two spaced electric hot plates powered by a suitable connection to a commercial electricity outlet.

16. The cooking grill of claim 14 wherein said heating means includes two burners on a residential cooking range.

17. The cooking grill of claim 11 wherein one of said tabs is manually operable from an unlocked position to a locked position and vice versa to prevent unintended movement of said dish with respect to said ring.

* * * * *